United States Patent
Chae et al.

(10) Patent No.: US 9,160,597 B2
(45) Date of Patent: Oct. 13, 2015

(54) METHOD FOR ESTIMATING OFDM INTEGER FREQUENCY OFFSET, OFDM INTEGER FREQUENCY OFFSET ESTIMATOR AND OFDM RECEIVER SYSTEM

(71) Applicant: Research & Business Foundation SUNGKYUNKWAN UNIVERSITY, Suwon-si (KR)

(72) Inventors: Keun Hong Chae, Suwon-si (KR); Seok Ho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/546,536

(22) Filed: Nov. 18, 2014

(65) Prior Publication Data
US 2015/0172089 A1    Jun. 18, 2015

(30) Foreign Application Priority Data
Nov. 19, 2013   (KR) .................. 10-2013-0140685

(51) Int. Cl.
*H04L 27/06*    (2006.01)
*H04L 27/26*    (2006.01)

(52) U.S. Cl.
CPC ........ *H04L 27/2646* (2013.01); *H04L 27/2657* (2013.01)

(58) Field of Classification Search
CPC ............ H04L 27/2657; H04L 27/2662; H04L 27/2656; H04L 27/2655; H04L 27/2663; H04L 27/2659
USPC .......................... 375/260, 340, 343
See application file for complete search history.

(56) References Cited

U.S. PATENT DOCUMENTS

| | | | | |
|---|---|---|---|---|
| 7,386,058 | B2 * | 6/2008 | Fujii | 375/267 |
| 7,649,963 | B2 * | 1/2010 | Choi et al. | 375/340 |
| 8,401,546 | B2 * | 3/2013 | Landry et al. | 455/427 |
| 2009/0080547 | A1 * | 3/2009 | Naka et al. | 375/260 |

* cited by examiner

*Primary Examiner* — Emmanuel Bayard
(74) *Attorney, Agent, or Firm* — NSIP Law

(57) ABSTRACT

A method of estimating an orthogonal frequency division multiplexing (OFDM) integer frequency offset is disclosed. The method includes generating N combined sub-carrier components by superposing G received sub-carrier components of N received sub-carrier components constituting received symbol, outputting a primary estimated integer frequency offset value from a candidate value, which makes primary correlated values, obtained with respect to primary integer frequency offset candidate values, to be largest, and outputting a secondary estimated integer frequency offset value from a secondary candidate value, which makes secondary correlated values, obtained with respect to secondary integer frequency offset candidate values based on primary estimated integer frequency offset value, to be largest.

11 Claims, 4 Drawing Sheets

METHOD FOR ESTIMATING OFDM INTEGER FREQUENCY OFFSET, OFDM INTEGER FREQUENCY OFFSET ESTIMATOR AND OFDM RECEIVER SYSTEM

CROSS-REFERENCE TO RELATED APPLICATIONS

This application claims the benefit under 35 U.S.C. §119(a) of Korean Patent Application No. 10-2013-0140685 filed on Nov. 19, 2013, in the Korean Intellectual Property Office, the entire disclosure of which is incorporated herein in by reference for all purposes.

BACKGROUND

1. Technical Field

The present invention relates generally to orthogonal frequency division multiplexing (OFDM) demodulation technology and, more particularly, to technology for estimating an OFDM integer frequency offset.

2. Description of the Related Art

OFDM signals have been widely used as physical layer standard technology in high-speed wireless communication standards, such as WiFi, Long Term Evolution (LTE), IEEE 802.16, etc. due to their advantages of being robust to multipath fading and achieving high frequency efficiency.

OFDM signals perform modulation and demodulation in the frequency domain, and particularly transmit information on their sub-carriers.

Due to the instability of an oscillator on a reception side or the Doppler effect, a frequency offset occurring in a carrier is indispensible. This frequency offset becomes an absolute cause of error during the demodulation of an OFDM signal because the OFDM signal encodes information in the frequency. Unless a frequency offset is accurately estimated and compensated for, an OFDM symbol is shifted by the frequency offset in the frequency domain, so that the orthogonality of a carrier is destructed, thereby making demodulation impossible or resulting in demodulation into a symbol having completely different information.

A frequency offset is classified as an integer frequency offset that is represented by an integer multiple of a sub-carrier spacing, or a fractional frequency offset that is represented by a value within a sub-carrier spacing. An integer frequency offset and a fractional frequency offset are independently estimated because they have different influences on an OFDM signal and are estimated using different estimation methods. Generally, a fractional frequency offset is estimated first, and then an integer frequency offset is estimated by compensating for the fractional frequency offset.

In general, the estimation of and compensation for an OFDM frequency offset are performed using training symbols that have been made known to both a transmission side and a reception side in advance.

A transmission side generates an OFDM training symbol via an inverse fast Fourier transform (IFFY) and transmits it. If it is assumed that a fractional frequency offset has been completely estimated and compensated for using a well-known method, a reception side estimates an integer frequency offset based on a frequency offset candidate value related to the acquisition of the largest correction result by performing a correlation operation on previously known local training symbols and local symbols shifted using a plurality of frequency offset candidate values, with respect to a received OFDM symbol.

In this case, the conventional technology of the following non-patent document [1] is problematic in that it cannot correctly estimate an integer frequency offset when there is a time offset. Although the conventional technology of non-patent document [2] can overcome the influence of a time offset, it is problematic in that it requires highly complex operations.

Accordingly, there is a need for a new method of estimating an integer frequency offset, which is capable of eliminating high complexity, i.e., the problem of conventional frequency offset estimation schemes, while overcoming the influence of a time offset.

RELATED TECHNICAL DOCUMENTS

Non-patent Documents (Non-patent document 1) [1] Nogami, H.; Nagashima, T., "A frequency and timing period acquisition technique for OFDM systems," Personal, Indoor and Mobile Radio Communications, 1995. PIMRC'95. Wireless: Merging onto the Information Superhighway., Sixth IEEE International Symposium on, vol. 3, no., pp. 1010, 27-29 September 1995

(Non-patent document 2) [2] Keukjoon Bang; Namshin Cho; Jaehee Cho; Heeyoung Jun; Kwangchul Kim; Hyuncheol Park; Daesik Hong, "A coarse frequency offset estimation in an OFDM system using the concept of the coherence phase bandwidth," Communications, IEEE Transactions on, vol. 49, no. 8, pp. 1320, 1324, August 2001

SUMMARY

An object of the present invention is to provide a method of estimating an OFDM integer frequency offset, and an OFDM integer frequency offset estimator and OFDM receiver system using the same.

An object of the present invention is to provide a method of estimating an OFDM integer frequency offset, which is capable of trading off complexity and estimation accuracy against each other, and an OFDM integer frequency offset estimator and OFDM receiver system using the same.

The objects of the present invention are not limited to the above-described objects, and other objects that have not been described above will be clearly understood by those skilled in the art from the following description.

In accordance with an aspect of the present invention, there is provided a method of estimating an orthogonal frequency division multiplexing (OFDM) integer frequency offset, including:

generating N combined sub-carrier components by superposing G received sub-carrier components of N received sub-carrier components constituting a received OFDM symbol;

obtaining primary correlated values by summing interval correlated values obtained by performing correlation operations on the combined sub-carrier components and local training symbols in respective coherence phase bandwidth (CPB) intervals with respect to primary integer frequency offset candidate values d=0, G, . . . , $\lfloor N/G \rfloor G$ and then outputting an integer frequency offset candidate value d producing a largest primary correlated value as a primary estimated integer frequency offset value $\epsilon_c$; and obtaining secondary correlated values by summing interval correlated values obtained by performing correlation operations on the sub-carrier components and the local training symbols in respective CPB intervals with respect to secondary integer frequency offset candidate values $\bar{d}=\epsilon$, $\epsilon+1, \ldots, \epsilon+G-1$ based on the primary estimated integer frequency offset value $\tilde{\epsilon}_c$, and then outputting a secondary integer frequency offset candidate value $\tilde{d}$ producing the largest secondary correlated value as a secondary estimated integer frequency offset value $\hat{\epsilon}_p$.

According to an embodiment, the combined sub-carrier components $P_k$ formed by superposing a plurality of received sub-carrier components may be generated in accordance with the following equation:

$$P_k = \sum_{g=0}^{G-1} R_{(k+g)_N} \text{ for } k = 0, 1, \ldots, N-1$$

Where $(\bullet)_N$ is a module-N operation and denotes a remainder obtained through division by N, and g is an integer satisfying $0 \leq g \leq G$ and denotes indexes of the received sub-carrier components shifted and superposed to generate the combined sub-carrier components $P_k$.

According to an embodiment, the primary estimated integer frequency offset value $\tilde{\epsilon}_c$ may be calculated in accordance with the following equation:

$$\tilde{\epsilon}_c = \text{argmax}_d \left\{ \sum_{m=0}^{K-1} \left| \sum_{k=0}^{B_c-1} Z^*_{k+mB_c} P_{(k+mB_c+d)_N} \right| \right\}$$

where $\tilde{\epsilon}_c$ is the primary estimated integer frequency offset value, the primary integer frequency offset candidate values d are d=0, G, ..., $\lfloor N/G \rfloor G$, the number of which is $\lfloor N/G \rfloor +1$, $(\bullet)_N$ is a module-N operation and denotes the remainder obtained through division by N, $(\bullet)^*$ is a conjugate complex operator, $B_c$ is a CPB value, $K = N/B_c$, and $\text{argmax}_x\{f(x)\}$ denotes an x value that makes f(x) largest.

According to an embodiment, the secondary estimated integer frequency offset value $\hat{\epsilon}_p$ may be calculated in accordance with the following equation:

$$\hat{\epsilon}_p = \text{argmax}_{\tilde{d}} \left\{ \sum_{m=0}^{K-1} \left| \sum_{k=0}^{B_c-1} Z^*_{k+mB_c} P_{(k+mB_c+\tilde{d})_N} \right| \right\}$$

where $\hat{\epsilon}_p$ is the secondary estimated integer frequency offset value, and secondary integer frequency offset candidate values $\tilde{d} = \tilde{\epsilon}, \tilde{\epsilon}+1, \ldots, \tilde{\epsilon}+G-1$ are G in number.

According to an embodiment, the CPB may be defined by the following equation:

$$B_c = \frac{1}{2n_t N}$$

where $B_c$ is a CPB value, and $n_t$ is a maximum time offset value that can be estimated by a relevant OFDM receiver system.

In accordance with another aspect of the present invention, there is provided a less-complex apparatus for estimating an OFDM integer frequency offset, including:

a combined sub-carrier generation unit configured to generate N combined sub-carrier components by superposing G received sub-carrier components of N received sub-carrier components constituting a received OFDM symbol;

a primary integer frequency offset estimation unit configured to obtain primary correlated values by summing interval correlated values obtained by performing correlation operations on the combined sub-carrier components and local training symbols in respective coherence phase bandwidth (CPB) intervals with respect to primary integer frequency offset candidate values d=0, G, ..., $\lfloor N/G \rfloor G$, and to then calculate an integer frequency offset candidate value d producing a largest primary correlated value as a primary estimated integer frequency offset value $\tilde{\epsilon}_c$; and a secondary integer frequency offset estimation unit configured to obtain secondary correlated values by summing interval correlated values obtained by performing correlation operations on the sub-carrier components and the local training symbols in respective CPB intervals with respect to secondary integer frequency offset candidate values $\tilde{d} = \tilde{\epsilon}, \tilde{\epsilon}+1, \ldots, \tilde{\epsilon}+G-1$ based on the primary estimated integer frequency offset value $\tilde{\epsilon}_c$, and to then calculate a secondary integer frequency offset candidate value $\tilde{d}$ producing the largest secondary correlated value as a secondary estimated integer frequency offset value $\hat{\epsilon}_p$.

According to an embodiment, the combined sub-carrier components $P_k$ formed by superposing a plurality of received sub-carrier components may be generated in accordance with the following equation:

$$P_k = \sum_{g=0}^{G-1} R_{(k+g)_N} \text{ for } k = 0, 1, \ldots, N-1$$

where $(\bullet)_N$ is a module-N operation and denotes a remainder obtained through division by N, and g is an integer satisfying $0 \leq g \leq G$ and denotes indexes of the received sub-carrier components shifted and superposed to generate the combined sub-carrier components $P_k$.

According to an embodiment, the primary estimated integer frequency offset value $\tilde{\epsilon}_c$ may be calculated in accordance with the following equation:

$$\tilde{\epsilon}_c = \text{argmax}_d \left\{ \sum_{m=0}^{K-1} \left| \sum_{k=0}^{B_c-1} Z^*_{k+mB_c} P_{(k+mB_c+d)_N} \right| \right\}$$

where $\tilde{\epsilon}_c$ is the primary estimated integer frequency offset value, the primary integer frequency offset candidate values d are d=0, G, ..., $\lfloor N/G \rfloor G$, the number of which is $\lfloor N/G \rfloor +1$, $(\bullet)_N$ is a module-N operation and denotes the remainder obtained through division by N, $(\bullet)^*$ is a conjugate complex operator, $B_c$ is a CPB value, $K = N/B_c$, and $\text{argmax}_x\{f(x)\}$ denotes an x value that makes f(x) largest.

According to an embodiment, the secondary estimated integer frequency offset value $\hat{\epsilon}_p$ may be calculated in accordance with the following equation:

$$\hat{\epsilon}_p = \text{argmax}_{\tilde{d}} \left\{ \sum_{m=0}^{K-1} \left| \sum_{k=0}^{B_c-1} Z^*_{k+mB_c} P_{(k+mB_c+\tilde{d})_N} \right| \right\}$$

where $\hat{\epsilon}_p$ is the secondary estimated integer frequency offset value, and secondary integer frequency offset candidate values $\tilde{d} = \tilde{\epsilon}, \tilde{\epsilon}+1, \ldots, \tilde{\epsilon}+G-1$ are G in number.

According to an embodiment, the CPB may be defined by the following equation:

$$B_c = \frac{1}{2n_t N}$$

where $B_c$ is a CPB value, and $n_t$ is a maximum time offset value that can be estimated by a relevant OFDM receiver system.

In accordance with still another aspect of the present invention, there is provided an OFDM receiver system, including:

a radio frequency (RF) receiving unit configured to receive a radio signal via an antenna;

a down conversion unit configured to convert the received radio signal into a baseband signal;

a synchronization unit configured to, when the baseband signal includes an OFDM modulated training symbol, estimate frequency and time offsets of the baseband signal using a received training symbol and a local training symbol, and then compensate for frequency shift and delay of the baseband signal based on the estimated frequency and time offsets; and a decoding unit configured to recover data from the baseband signal that has been compensated for the frequency and time offsets;

wherein the synchronization unit operates to:

in order to estimate an integer frequency offset of the frequency offset, generate N combined sub-carrier components by superposing G received sub-carrier components of N received sub-carrier components constituting a received OFDM symbol;

obtain primary correlated values by summing interval correlated values obtained by performing correlation operations on the combined sub-carrier components and local training symbols in respective coherence phase bandwidth (CPB) intervals with respect to primary integer frequency offset candidate values $d=0, G, \ldots, \lfloor N/G \rfloor G$, and then calculate an integer frequency offset candidate value d producing a largest primary correlated value as a primary estimated integer frequency offset value $\tilde{\epsilon}_c$; and obtain secondary correlated values by summing interval correlated values obtained by performing correlation operations on the sub-carrier components and the local training symbols in respective CPB intervals with respect to secondary integer frequency offset candidate values $\tilde{d}=\tilde{\epsilon}, \tilde{\epsilon}+1, \ldots, \tilde{\epsilon}+G-1$ based on the primary estimated integer frequency offset value $\tilde{\epsilon}_c$, and then calculate a secondary integer frequency offset candidate value $\tilde{d}$ producing the largest secondary correlated value as a secondary estimated integer frequency offset value $\hat{\epsilon}_p$.

The method of estimating an OFDM integer frequency offset and an OFDM integer frequency offset estimator and OFDM receiver system using the same according to the present invention are capable of reducing complexity and considerably decreasing computational load required for estimation compared to a conventional method of estimating an OFDM integer frequency offset.

The method of estimating an OFDM integer frequency offset and an OFDM integer frequency offset estimator and OFDM receiver system using the same according to the present invention are capable of easily trading off a reduction in computational load and a reduction in estimation accuracy performance, attributable to a reduction in complexity, against each other, thereby flexibly dealing with various communication conditions and various customer demands.

The advantages of the present invention are not limited to the above-described advantages, and other advantages that have not been described above will be clearly understood by those skilled in the art from the following description.

DETAILED DESCRIPTION

Figure 1:
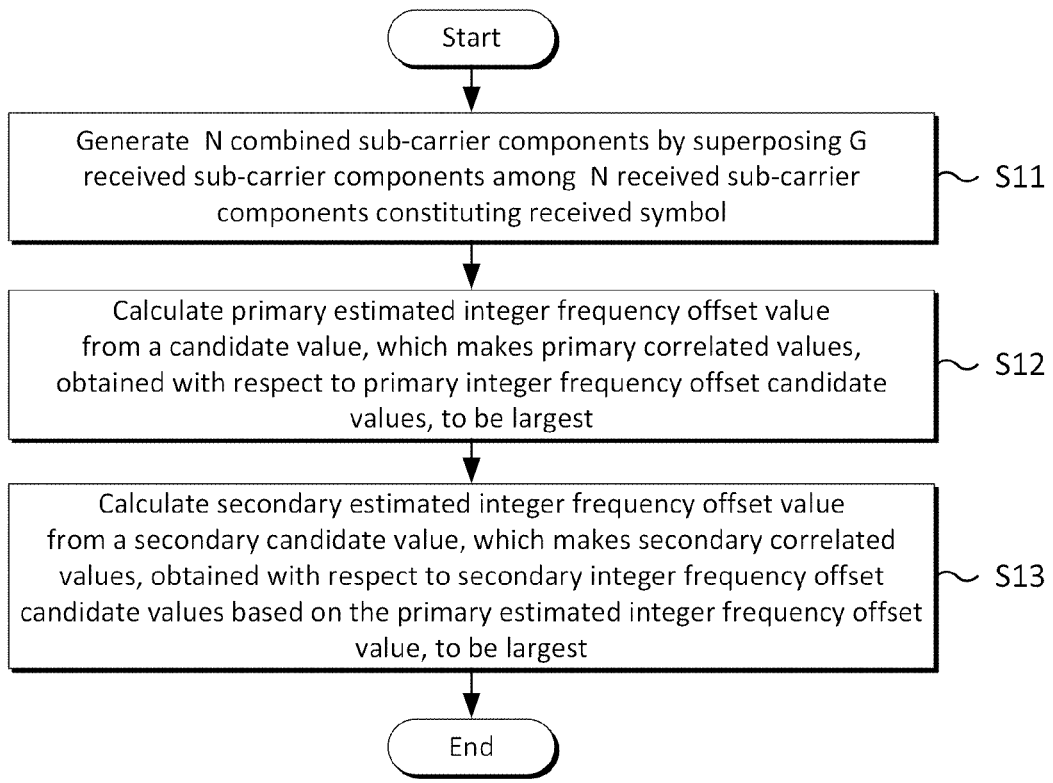
FIG. 1 is a flowchart illustrating a method of estimating an OFDM integer frequency offset according to an embodiment of the present invention.

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and descriptions of the same components will be omitted.

Prior to the description of a method of estimating an OFDM integer frequency offset according to the present invention, a method of estimating an integer frequency offset using a common OFDM training symbol is described first.

The n-th training symbol sample $z_n$ of an OFDM training symbol generated via an inverse fast Fourier transform (IFFT) is expressed as Equation 1 below:

$$z_n = \frac{1}{\sqrt{N}} \sum_{k=0}^{N-1} Z_k e^{j2\pi nk/N} \quad (1)$$

where $Z_k$ is a training symbol carried on an k-th sub-carrier, and N is the number of sub-carriers. When a transmission side transmits the n-th training symbol sample $z_n$, a signal received by a reception side has a time offset and a frequency offset depending on a propagation environment between the transmission and reception sides or the relative moving speeds of the transmission and reception sides or due to an internal clock error between the transmission and reception sides or the oscillation frequency error of a frequency oscillator.

When a time offset and a frequency offset are set to $n_0$ and $f_0$, respectively, the n-th received sample $r_n$ of a signal received by a reception side may be expressed by Equation 2 below:

$$r_n = z_{n-n_0} e^{j2\pi f_0 (n-n_0)/N} + w_n \quad (2)$$

where $w_n$ is a complex additive white Gaussian noise sample whose average is 0 and whose variance is $\sigma_w^2$.

In Equation 2, the frequency offset included in the received sample $r_n$ is is a value normalized by sub-carrier spacing, and the time offset has a value normalized by a sample interval.

The normalized frequency offset $f_0$ may be represented by an integer frequency offset $\epsilon$, i.e., an integer component, and a fractional frequency offset $f_f$, i.e., a fractional component. Since the fractional frequency offset is completely different from the integer frequency offset in terms of an estimation method, effect and influence, it is left out of discussion in the present invention, and it is assumed that it has been completely estimated and compensated for using a separate method.

When the received OFDM symbols are recovered by performing an FFT on the received sample $r_n$, the k-th sub-carrier component $R_k$ of the received OFDM symbol is expressed as Equation 3 below:

$$R_k = \frac{1}{\sqrt{N}} \sum_{n=0}^{N-1} r_n e^{j2\pi kn/N} \qquad (3)$$
$$= Z_{k-\epsilon} e^{-j2\pi n_0(k-\epsilon)/N} + W_k$$

where $W_k$ is the k-th component of an FFT output with respect for $\{w_n\}_{n=0}^{N-1}$.

In Equation 1, a training symbol $Z_k$ is carried on the k-th sub-carrier $z_n$ of a transmission signal, and $Z_{k-\epsilon}$ is present on the k-th sub-carrier $R_k$ of a received signal due to an integer frequency offset $\epsilon$.

Since the integer frequency offset $\epsilon$ is one of possible sub-carriers and the number of sub-carriers is N, N integer frequency offset candidate values are present.

As described above, in order to estimate an integer frequency offset, a correlation operation is performed on N local training symbols $\{Z_k\}_{k=0}^{N-1}$, obtained by phase-shifting a local training symbol Z by N integer frequency offset candidate values, and a received OFDM symbol. In this case, when the time offset is large, a correlated value is considerably decreased, which makes it difficult to accurately determine a frequency offset candidate value for which a correlated value is maximum.

According to non-patent document [2], in order to overcome the influence of the time offset, a coherence phase bandwidth (CPB), i.e., a range in which a correlated value monotonically increases, may be used. That is, a correlated value corresponding to a corresponding integer frequency offset candidate value is obtained by dividing an overall correlation interval into $K(K=N/B_c)$ subordinate correlation intervals by the CPB with respect to each integer frequency offset candidate value and then summing correlated values obtained in respective subordinate correlation intervals.

The CPB $B_c$ is defined as Equation 4 below:

$$B_c = \frac{1}{2n_t N} \qquad (4)$$

where $n_t$ is a maximum time offset value that can be handled by an OFDM receiver system, i.e., a maximum time offset value that can be estimated when the time offset is estimated after the integer frequency offset has been estimated and compensated for.

If an actual time offset falls within the CPB value defined by Equation 4, an influence on the correlated value is insignificant even when there is a slight time offset, and thus a frequency offset can be appropriately estimated in spite of the presence of the time offset.

However, when a time offset is larger than the CPB, the time offset considerably decreases a correlated value, and thus a frequency offset cannot be appropriately estimated.

Accordingly, the estimation of a frequency offset is discussed on the assumption that a time offset is smaller than the CPB defined by Equation 4.

According to non-patent document [2], etc., in order to estimate an integer frequency offset using CPB $B_c$, a certain integer frequency offset candidate value d producing the largest of correlated values obtained by summing interval correlated values obtained by performing correlation operations on N shifted local training symbols $\{Z_k\}_{k=0}^{N-1}$ and a received symbol $R_k$ in respective CPB intervals may be calculated as an estimated integer frequency offset value, as in Equation 5 below:

$$\hat{\epsilon} = \mathrm{argmax}_d \left\{ \sum_{m=0}^{k-1} \left| \sum_{k=0}^{B_c-1} Z^*_{k+mB_c} R_{(k+mB_c+d)_N} \right| \right\} \qquad (5)$$

where $\hat{\epsilon}$ is the estimated integer frequency offset value, d is the integer frequency offset candidate value and one positive integer of $\{0, 1, \ldots, N-1\}$, $(\bullet)_N$ is a module-N operation and denotes the remainder obtained through division by N, $(\bullet)^*$ is a conjugate complex operator, and $K=N/B_c$. $\mathrm{argmax}_x\{f(x)\}$ denotes an x value that makes f(x) largest.

Equation 5 specifies the certain integer frequency offset candidate value d first, divides N sub-carrier components into K ($0 \leq m \leq K-1$) correlation intervals each composed of $B_c$ sub-carrier components, and repeatedly performs a correlation operation on $B_c$ ($0 \leq k \leq B_c-1$) local training symbols $Z_k^*$ and the received symbol $R_k$ in an m-th correlation interval.

According to the correlation operation of Equation 5, when an accurate integer frequency offset is $\epsilon$, a maximum correlated value is obtained when the candidate value is $d=\epsilon$. In particular, as N increases, the difference between a correlated value and the remaining correlated values also increases when the candidate value is $d=\epsilon$.

However, according to the correlation operation of Equation 5, in order to compute the correlated value of N integer frequency offset candidate values, $4N^2$ real number multiplications are required, and $2N^2+2N(N-1)=4N^2-1$ real number additions are required. For example, when N=1024, 1 million or more real number multiplications are relquired.

Referring to FIG. 1 in order to illustrate a method of estimating an OFDM integer frequency offset according to the present invention, which is intended to reduce high complexity, FIG. 1 is a flowchart illustrating a method of estimating an OFDM integer frequency offset according to an embodiment of the present invention.

In FIG. 1, first, at step S11, N combined sub-carrier components $P_k$ (where k is an integer that satisfies $0 \leq k \leq N-1$) are generated by frequency shifting and superposing G received sub-carrier components $R_{(k+g)N}$ ($0 \leq g \leq G-1$) of N received sub-carrier components constituting a received OFDM symbol.

More specifically, new combined sub-carrier components $P_k$ generated by superposing a plurality of received sub-carrier components may be defined as Equation 6 below:

$$P_k = \sum_{g=0}^{G-1} R_{(k+g)_N} \text{ for } k = 0, 1, \ldots, N-1 \quad (6)$$

where G is the number of received sub-carrier components that are shifted and superposed to generate the combined sub-carrier components $P_k$. $(\bullet)_N$ is a module-N operation and denotes the remainder obtained through division by N, and g is an integer satisfying $0 \leq g \leq G$ and denotes the indexes of the received sub-carrier components $R_k$ shifted and superposed to generate the combined sub-carrier components $P_k$.

For each k, G received sub-carrier components $\{R_x\}_{(k)_N}^{(k+G-1)_N}$ ranging from $R_{(k)_N}$ to $R_{(k+G-1)_N}$ are shifted and combined in the frequency domain to thus form N combined sub-carrier components $P_k$.

Next, at step S12, primary correlated values may be obtained by summing interval correlated values obtained by performing correlation operations on the combined sub-carrier components $P_k$ and the local training symbols $\{Z_k\}_{k=0}^{N-1}$ in respective CPB intervals with respect to primary integer frequency offset candidate values d=0, G, ..., $\lfloor N/G \rfloor G$ and then an integer frequency offset candidate value d producing the largest primary correlated value may be calculated as a primary estimated integer frequency offset value $\tilde{\epsilon}_c$, as in Equation 7 below:

$$\tilde{\epsilon}_c = \text{argmax}_d \left\{ \sum_{m=0}^{K-1} \left| \sum_{k=0}^{B_c-1} Z^*_{k+mB_c} P_{(k+mB_c+d)_N} \right| \right\} \quad (7)$$

where $\tilde{\epsilon}_c$ is the primary estimated integer frequency offset value, and the primary integer frequency offset candidate values d are d=0, G, ..., $\lfloor N/G \rfloor G$ and the number of primary integer frequency offset candidate values d is $\lfloor N/G \rfloor + 1$. $(\bullet)_N$ is a module-N operation and denotes the remainder obtained through division by N, $(\bullet)^*$ is a conjugate complex operator, $B_c$ is a coherence phase bandwidth (CPB) value defined as Equation 4, and $K=N/B_c$. argmax$_x\{f(x)\}$ denotes an x value that makes f(x) largest.

Accordingly, since the number of candidate values d to be computed is merely $\lfloor N/G \rfloor + 1$, the primary estimated frequency offset value $\tilde{\epsilon}_c$ is primarily calculated when the primary correlated value operation of Equation 7 is repeated $\lfloor N/G \rfloor + 1$ times. In this case, according to Equation 6, a single primary estimated frequency offset value $\tilde{\epsilon}_c$ is actually representative of G received sub-carrier components. Accordingly, the primary estimated frequency offset value $\tilde{\epsilon}_c$ becomes a secondary frequency offset candidate value $\tilde{d}=\tilde{\epsilon}, \tilde{\epsilon}+1, \ldots, \tilde{\epsilon}+G-1$ at a subsequent step.

Comparing Equation 7 with Equation 5, Equation 5 may be represented as a procedure in which a correlation operation is performed on each of all received sub-carrier components and a local training symbol first and then the results of the correlation operation are summed, whereas Equation 7 may be represented as a procedure in which G received sub-carrier components are combined into each combined sub-carrier component and then a correlation operation is performed on each combined sub-carrier component and a local training symbol.

Since correlation operations are linear operations based on the four fundamental arithmetic operations, a result obtained by summing the results of the correlation operations of waveforms should be the same as a result obtained by performing the correlation operations of summed waveforms.

Figure 2:
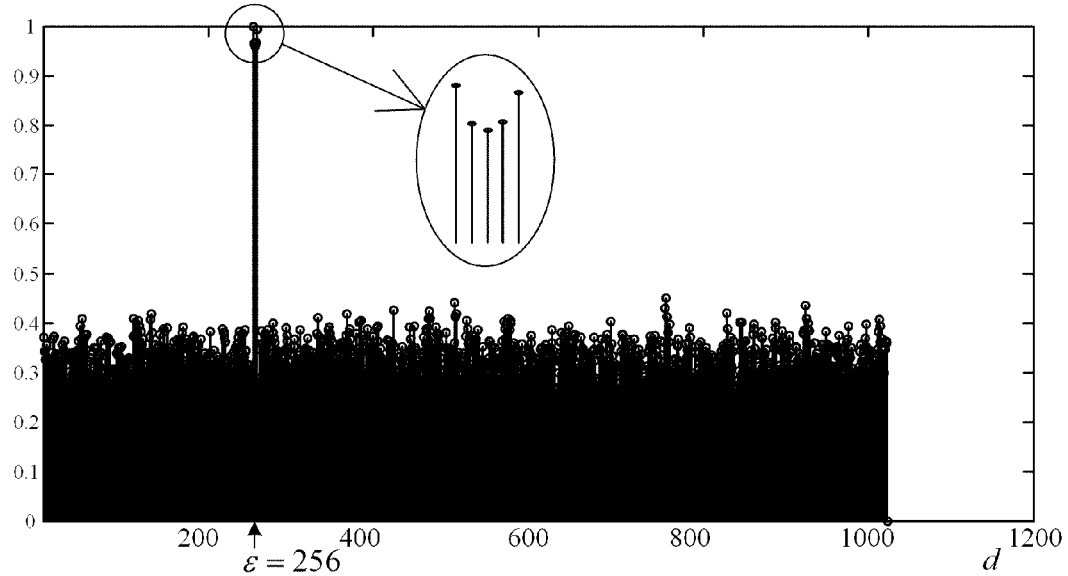
FIG. 2 is a graph indicating that G integer frequency offset candidates are obtained as a result of correlation operations in a method of estimating an OFDM integer frequency offset according to an embodiment of the present invention.

FIG. 2 is a graph illustrating normalized primary correlated values in a method of estimating an OFDM integer frequency offset according to an embodiment of the present invention. This drawing is a graph indicating that G integer frequency offset candidate values are obtained as a result of the primary correlation operations.

Referring to FIG. 2, when an accurate integer frequency offset is $\epsilon=256$, G is set to 5. As a result of the primary correlated value operations of Equation 7, five peaks appear at five integer frequency offset candidate value locations near 256.

In this case, it is not yet certain which of the five peaks will be selected as a final secondary estimated integer frequency offset value, and it may be said that a secondary candidate value to be selected as a secondary estimated integer frequency offset value is present among these five peaks.

Referring back to FIG. 1, at step S13, secondary correlated values may be obtained by summing interval correlated values obtained by performing correlation operations on the sub-carrier components $R_k$ and the local training symbols $\{Z_k\}_{k=0}^{N-1}$ in respective CPB intervals with respect to secondary integer frequency offset candidate values $\tilde{d}=\tilde{\epsilon}, \tilde{\epsilon}+1, \ldots, \tilde{\epsilon}+G-1$ based on the primary estimated integer frequency offset value $\tilde{\epsilon}_c$, and then a secondary integer frequency offset candidate value $\tilde{d}$ producing the largest secondary correlated value may be calculated as a secondary estimated integer frequency offset value $\hat{\epsilon}_p$, as in Equation 8 below:

$$\hat{\epsilon}_p = \text{argmax}_{\tilde{d}} \left\{ \sum_{m=0}^{K-1} \left| \sum_{k=0}^{B_c-1} Z^*_{k+mB_c} P_{(k+mB_c+\tilde{d})_N} \right| \right\} \quad (8)$$

where $\hat{\epsilon}_p$ is the secondary estimated integer frequency offset value.

In Equation 8, the number of candidate values $\tilde{d}$ to be calculated is merely G, and thus the secondary estimated integer frequency offset value $\hat{\epsilon}_p$ is calculated by performing a total of $\lfloor N/G \rfloor + G + 1$ correlated value operations, i.e., the sum of the $\lfloor N/G \rfloor + 1$ primary correlated value operations of Equation 7 and the G secondary correlated value operations of Equation 8.

The number of real number multiplications associated with Equations 7 and 8 is $4N(\lfloor N/G \rfloor + G)$ and the number of real number additions is $2(\lfloor N/G \rfloor + G)(2N-1) + 2N(\lfloor N/G \rfloor + 1)(G-1)$. From this, it can be seen that the complexity is considerably reduced to about 1/G compared to that in the case where the correlation operation of Equation 5 requires $4N^2$ real number multiplications and $2N^2 + 2N(N-1) = 4N^2 - 1$ real number additions.

In a particular case, when G=1, the above becomes the same as the technology of non-patent document [2].

Figure 3:
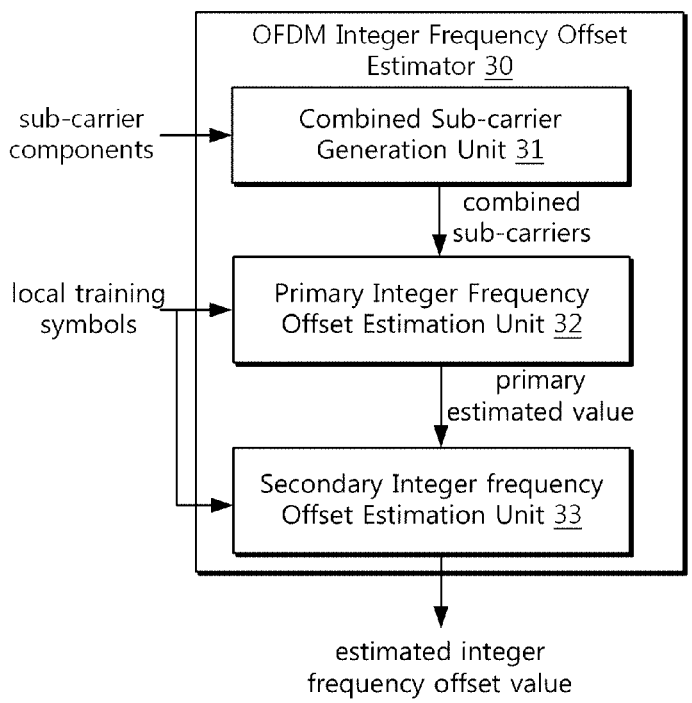
FIG. 3 is a block diagram illustrating an apparatus for estimating an OFDM integer frequency offset according to an embodiment of the present invention.

FIG. 3 is a block diagram illustrating an apparatus for estimating an OFDM integer frequency offset according to an embodiment of the present invention.

Referring to FIG. 3, an apparatus 30 for estimating an OFDM integer frequency offset includes a combined sub-carrier generation unit 31, a primary integer frequency offset estimation unit 32, and a secondary integer frequency offset estimation unit 33.

More specifically, the combined sub-carrier generation unit 31 generates N combined sub-carrier components $P_k$ (where k is an integer that satisfies $0 \leq k \leq N-1$) by superposing G received sub-carrier components $R_{(k+g)_N}$ ($0 \leq g \leq G-1$) of N received sub-carrier components constituting a received OFDM symbol, as in Equation 6 above.

Thereafter, the primary integer frequency offset estimation unit 32 may obtain primary correlated values by summing interval correlated values obtained by performing correlation operations on the combined sub-carrier components $P_k$ and the local training symbols $\{Z_k\}_{k=0}^{N-1}$ in respective CPB intervals with respect to primary integer frequency offset candidate values d=0, G, ..., $\lfloor N/G \rfloor G$ and then may calculate an integer frequency offset candidate value d producing the largest primary correlated value as a primary estimated integer frequency offset value $\tilde{\epsilon}_c$, as in Equation 7 above.

Next, the secondary integer frequency offset estimation unit 33 may obtain secondary correlated values by summing interval correlated values obtained by performing correlation operations on the sub-carrier components $R_k$ and the local training symbols $\{Z_k\}_{k=0}^{N-1}$ in respective CPB intervals with respect to secondary integer frequency offset candidate values $\tilde{d}=\tilde{\epsilon}, \tilde{\epsilon}+1, \ldots, \tilde{\epsilon}+G-1$ based on the primary estimated integer frequency offset value $\tilde{\epsilon}_c$, and then may calculate a secondary integer frequency offset candidate value $\tilde{d}$ producing the largest secondary correlated value as a secondary estimated integer frequency offset value $\hat{\epsilon}_p$, as in Equation 8 above.

Figure 4:
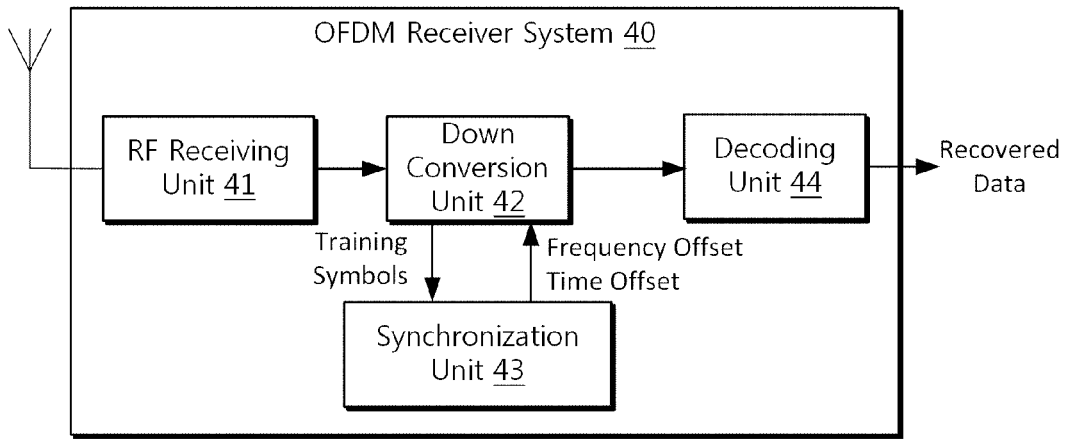
FIG. 4 is a block diagram illustrating an OFDM receiver system according to an embodiment of the present invention.

FIG. 4 is a block diagram illustrating an OFDM receiver system according to an embodiment of the present invention.

Referring to FIG. 4, an OFDM receiver system 40 includes an radio frequency (RF) receiving unit 41, a down conversion unit 42, a synchronization unit 43, and a decoding unit 44.

The RF receiving unit 41 receives a radio signal via an antenna, and the received radio signal is converted into a baseband signal via the down conversion unit 42.

The synchronization unit 43, when the baseband signal includes an OFDM modulated training symbol, estimates the frequency and time offsets of the baseband signal using a received training symbol and a local training symbol, and then compensates the baseband signal based on the estimated frequency and time offsets.

More specifically, the synchronization unit 43, in order to estimate the integer frequency offset of the frequency offset, generates N combined sub-carrier components by superposing G received sub-carrier components of N received sub-carrier components constituting a received OFDM symbol.

Thereafter, the synchronization unit 43 may obtain primary correlated values by summing interval correlated values obtained by performing correlation operations on the combined sub-carrier components and the local training symbols in respective CPB intervals with respect to primary integer frequency offset candidate values d=0, G, ..., $\lfloor N/G \rfloor G$ and then may calculate an integer frequency offset candidate value d producing the largest primary correlated value as a primary estimated integer frequency offset value $\tilde{\epsilon}_c$, as in Equation 7 above.

Next, the synchronization unit 43 may obtain secondary correlated values by summing interval correlated values obtained by performing correlation operations on the sub-carrier components and the local training symbols in respective CPB intervals with respect to secondary integer frequency offset candidate values $\tilde{\epsilon}=\tilde{\epsilon}, \tilde{\epsilon}+1, \ldots, \tilde{\epsilon}+G-1$ based on the primary estimated integer frequency offset value $\tilde{\epsilon}_c$, and then may calculate a secondary integer frequency offset candidate value $\tilde{d}$ producing the largest secondary correlated value as a secondary estimated integer frequency offset value $\tilde{\epsilon}_p$, as in Equation 8 above.

The decoding unit 44 recovers data from the baseband signal that has been compensated for the frequency and time offsets.

Figure 5:
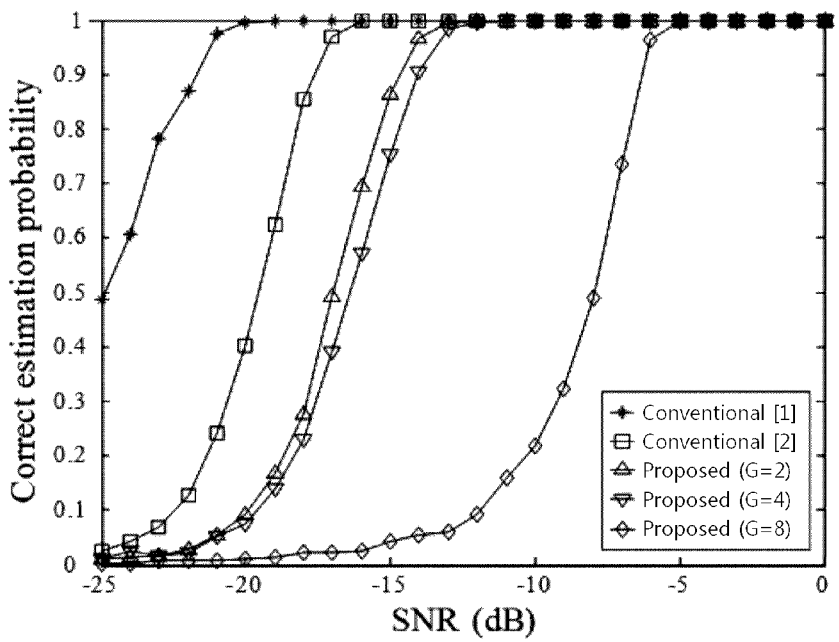
FIGS. 5 to 7 are graphs comparing the performance of a method of estimating an OFDM integer frequency offset according to an embodiment of the present invention with the performance of conventional schemes.
Figure 6:
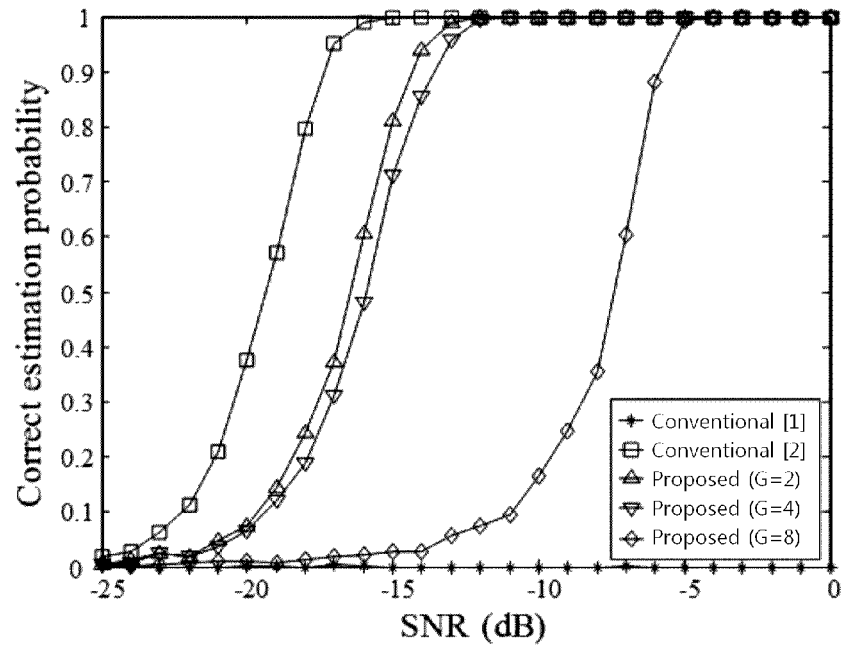
Figure 7:
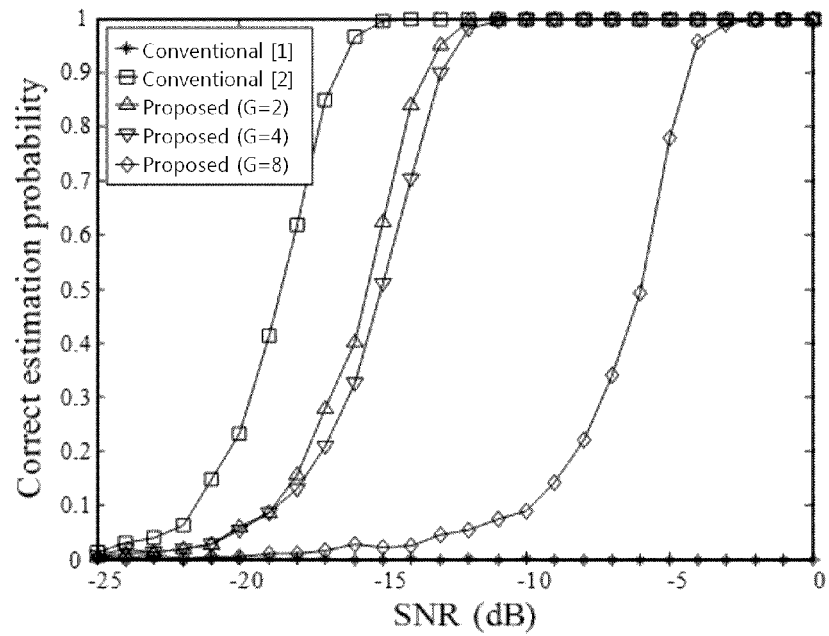

FIGS. 5 to 7 are graphs comparing the performance of a method of estimating an OFDM integer frequency offset according to an embodiment of the present invention with the performance of conventional schemes.

Referring to FIGS. 5 to 7, for simulation experiments, N=1024, $B_c$=32, $n_t$=16, $\epsilon$=20, and the cyclic prefix length of an OFDM symbol is set to 16 samples.

FIGS. 5 to 7 illustrate correct estimation probability performance when time offsets are 0, 4 and 8 samples, in which case the correct estimation probability means the probability of an estimated integer frequency offset value being an actual integer frequency offset.

It can be seen that although the conventional technology of non-patent document [1] actual exhibited the best performance in FIG. 5 in which there was no time offset and exhibited good performance when the SNR was low, it could not estimate an integer frequency offset at all SNRs in FIGS. 6 and 7 in which a time offset was present.

The conventional technology of non-patent document [2] exhibited considerably good performance in FIG. 5 in which there was no time offset, and exhibited the best performance in FIGS. 6 and 7 in which there was no time offset, instead of the conventional technology [1] that could not appropriately operate. Furthermore, this conventional technology maintained performance even when there was a time offset as long as the time offset fell within the CPB.

However, as described above, the conventional technology [2] has very high operational complexity during the estimation of an integer frequency offset.

In contrast, in FIG. 5 in which there was no time offset and in FIGS. 6 and 7 in which there was a time offset, the present invention exhibited performance that decreased as the G value increased and operational load that rapidly decreased as the G value increased, based on the same SNR.

In an actual communication environment, a value of SNR is given or can be easily estimated. Accordingly, it is made possible to maintain appropriate-level performance while reducing complexity by flexibly determining a G value under the given SNR or within a range in which error probability is allowed.

For example, in a good communication environment in which SNR is −5 dB, the integer frequency offset estimation scheme of the present invention in which G=8 is employed instead of conventional technology [2] having high computational complexity, sufficient BER performance can be achieved, and the quantity of computational resources required for the estimation of an integer frequency offset can be reduced to about ⅛.

Accordingly, it is possible to construct an OFDM receiver system capable of more rapidly estimating an integer frequency offset using hardware having the same performance or to construct an OFDM receiver system capable of achieving equivalent demodulation performance using cheaper and lower operation performance hardware.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code stored on a computer-readable storage medium. The computer-readable storage medium includes all types of storage devices on which data that can be read by a computer system can be stored. Examples of the storage medium include ROM, RAM, an optical disk, magnetic tape, a floppy disk, hard disk, nonvolatile memory. Furthermore, the computer-readable medium may be distributed across a computer system connected over a network, and thus computer-readable code may be stored and executed in a distributed manner.

What is claimed is:

1. A method of estimating an orthogonal frequency division multiplexing (OFDM) integer frequency offset, comprising:
    generating N combined sub-carrier components by superposing G received sub-carrier components of N received sub-carrier components constituting a received OFDM symbol;
    obtaining primary correlated values by summing interval correlated values obtained by performing correlation operations on the combined sub-carrier components and local training symbols in respective coherence phase bandwidth (CPB) intervals with respect to primary integer frequency offset candidate values d=0, G, . . . , $\lfloor N/G \rfloor G$, and then outputting an integer frequency offset candidate value d producing a largest primary correlated value as a primary estimated integer frequency offset value $\tilde{\epsilon}_c$; and
    obtaining secondary correlated values by summing interval correlated values obtained by performing correlation operations on the sub-carrier components and the local training symbols in respective CPB intervals with respect to secondary integer frequency offset candidate values $\tilde{d}=\tilde{\epsilon}, \tilde{\epsilon}+1, \ldots, \tilde{\epsilon}+G-1$ based on the primary estimated integer frequency offset value $\tilde{\epsilon}_c$, and then outputting a secondary integer frequency offset candidate value $\tilde{d}$ producing the largest secondary correlated value as a secondary estimated integer frequency offset value $\hat{\epsilon}_p$.

2. The method of claim 1, wherein the combined sub-carrier components $P_k$ formed by superposing a plurality of received sub-carrier components are generated in accordance with the following equation:

$$P_k = \sum_{g=0}^{G-1} R_{(k+g)_N} \text{ for } k = 0, 1, \ldots, N-1$$

where $(\bullet)_N$ is a module-N operation and denotes a remainder obtained through division by N, and g is an integer satisfying $0 \le g \le G$ and denotes indexes of the received sub-carrier components shifted and superposed to generate the combined sub-carrier components $P_k$.

3. The method of claim 2, wherein the primary estimated integer frequency offset value $\tilde{\epsilon}_c$ is calculated in accordance with the following equation:

$$\tilde{\epsilon}_c = \text{argmax}_d \left\{ \sum_{m=0}^{K-1} \left| \sum_{k=0}^{B_c-1} Z^*_{k+mB_c} P_{(k+mB_c+d)_N} \right| \right\}$$

where $\tilde{\epsilon}_c$ is the primary estimated integer frequency offset value, the primary integer frequency offset candidate values d are d=0, G, . . . , $\lfloor N/G \rfloor G$, a number of which is $\lfloor N/G \rfloor + 1$, $(\bullet)_N$ is a module-N operation and denotes the remainder obtained through division by N, $(\bullet)^*$ is a conjugate complex operator, $B_c$ is a CPB value, $K=N/B_c$, and $\text{argmax}_x\{f(x)\}$ denotes an x value that makes $f(x)$ largest.

4. The method of claim 3, wherein the secondary estimated integer frequency offset value $\hat{\epsilon}_p$ is calculated in accordance with the following equation:

$$\hat{\epsilon}_p = \text{argmax}_{\tilde{d}} \left\{ \sum_{m=0}^{K-1} \left| \sum_{k=0}^{B_c-1} Z^*_{k+mB_c} P_{(k+mB_c+\tilde{d})_N} \right| \right\}$$

where $\hat{\epsilon}_p$ is the secondary estimated integer frequency offset value, and secondary integer frequency offset candidate values $\tilde{d}=\tilde{\epsilon}, \tilde{\epsilon}+1, \ldots, \tilde{\epsilon}+G-1$ are G in number.

5. The method of claim 1, wherein the CPB is defined by the following equation:

$$B_c = \frac{1}{2n_t N}$$

where $B_c$ is a CPB value, and $n_t$ is a maximum time offset value that can be estimated by a relevant OFDM receiver system.

6. A less-complex apparatus for estimating an OFDM integer frequency offset, comprising:
    a combined sub-carrier generation unit configured to generate N combined sub-carrier components by superposing G received sub-carrier components of N received sub-carrier components constituting a received OFDM symbol;
    a primary integer frequency offset estimation unit configured to obtain primary correlated values by summing interval correlated values obtained by performing correlation operations on the combined sub-carrier components and local training symbols in respective coherence phase bandwidth (CPB) intervals with respect to primary integer frequency offset candidate values d=0, G, . . . , $\lfloor N/G \rfloor G$, and to then calculate an integer frequency offset candidate value d producing a largest primary correlated value as a primary estimated integer frequency offset value $\tilde{\epsilon}_c$; and
    a secondary integer frequency offset estimation unit configured to obtain secondary correlated values by summing interval correlated values obtained by performing correlation operations on the sub-carrier components and the local training symbols in respective CPB intervals with respect to secondary integer frequency offset candidate values $\tilde{d}=\tilde{\epsilon}, \tilde{\epsilon}+1, \ldots, \tilde{\epsilon}+G-1$ based on the primary estimated integer frequency offset value $\tilde{\epsilon}_c$, and to then calculate a secondary integer frequency offset candidate value $\tilde{d}$ producing the largest secondary correlated value as a secondary estimated integer frequency offset value $\hat{\epsilon}_p$.

7. The less-complex apparatus of claim 6, wherein the combined sub-carrier components $P_k$ formed by superposing a plurality of received sub-carrier components are generated in accordance with the following equation:

$$P_k = \sum_{g=0}^{G-1} R_{(k+g)_N} \text{ for } k = 0, 1, \ldots, N-1$$

where $(\bullet)_N$ is a module-N operation and denotes a remainder obtained through division by N, and g is an integer satisfying $0 \leq g \leq G$ and denotes indexes of the received sub-carrier components shifted and superposed to generate the combined sub-carrier components $P_k$.

8. The less-complex apparatus of claim 7, wherein the primary estimated integer frequency offset value $\tilde{\epsilon}_c$ is calculated in accordance with the following equation:

$$\tilde{\epsilon}_c = \operatorname*{argmax}_{\tilde{d}}\left\{\sum_{m=0}^{K-1}\left|\sum_{k=0}^{B_c-1} Z^*_{k+mB_c} P_{(k+mB_c+\tilde{d})_N}\right|\right\}$$

where $\tilde{\epsilon}_c$ is the primary estimated integer frequency offset value, the primary integer frequency offset candidate values d are d=0, G, . . . , $\lfloor N/G \rfloor G$, a number of which is $\lfloor N/G \rfloor +1$, $(\bullet)_N$ is a module-N operation and denotes the remainder obtained through division by N, $(\bullet)^*$ is a conjugate complex operator, $B_c$ is a CPB value, $K=N/B_c$, and $\operatorname{argmax}_x\{f(x)\}$ denotes an x value that makes f(x) largest.

9. The less-complex apparatus of claim 8, wherein the secondary estimated integer frequency offset value $\hat{\epsilon}_p$ is calculated in accordance with the following equation:

$$\hat{\epsilon}_p = \operatorname*{argmax}_{\hat{d}}\left\{\sum_{m=0}^{K-1}\left|\sum_{k=0}^{B_c-1} Z^*_{k+mB_c} P_{(k+mB_c+\hat{d})_N}\right|\right\}$$

where $\hat{\epsilon}_p$ is the secondary estimated integer frequency offset value, and secondary integer frequency offset candidate values $\hat{d}=\tilde{\epsilon}, \tilde{\epsilon}+1, \ldots, \tilde{\epsilon}+G-1$ are G in number.

10. The less-complex apparatus of claim 6, wherein the CPB is defined by the following equation:

$$B_c = \frac{1}{2n_t N}$$

where $B_c$ is a CPB value, and $n_t$ is a maximum time offset value that can be estimated by a relevant OFDM receiver system.

11. An OFDM receiver system, comprising:
a radio frequency (RF) receiving unit configured to receive a radio signal via an antenna;
a down conversion unit configured to convert the received radio signal into a baseband signal;
a synchronization unit configured to, when the baseband signal includes an OFDM modulated training symbol, estimate frequency and time offsets of the baseband signal using a received training symbol and a local training symbol, and then compensate for frequency shift and delay of the baseband signal based on the estimated frequency and time offsets; and
a decoding unit configured to recover data from the baseband signal that has been compensated for the frequency and time offsets;
wherein the synchronization unit operates to:
in order to estimate an integer frequency offset of the frequency offset, generate N combined sub-carrier components by superposing G received sub-carrier components of N received sub-carrier components constituting a received OFDM symbol;
obtain primary correlated values by summing interval correlated values obtained by performing correlation operations on the combined sub-carrier components and local training symbols in respective coherence phase bandwidth (CPB) intervals with respect to primary integer frequency offset candidate values d=0, G, . . . , $\lfloor N/G \rfloor G$, and then calculate an integer frequency offset candidate value d producing a largest primary correlated value as a primary estimated integer frequency offset value $\tilde{\epsilon}_c$; and
obtain secondary correlated values by summing interval correlated values obtained by performing correlation operations on the sub-carrier components and the local training symbols in respective CPB intervals with respect to secondary integer frequency offset candidate values $\hat{d}=\tilde{\epsilon}, \tilde{\epsilon}+1, \ldots, \tilde{\epsilon}+G-1$ based on the primary estimated integer frequency offset value $\tilde{\epsilon}_c$, and then calculate a secondary integer frequency offset candidate value $\hat{d}$ producing the largest secondary correlated value as a secondary estimated integer frequency offset value $\tilde{\epsilon}_p$.

* * * * *